O. OLSEN.
PNEUMATIC PRESSURE GAGE.
APPLICATION FILED JULY 21, 1909.

984,153.

Patented Feb. 14, 1911.

WITNESSES;
R. S. Berry,
C. A. Penfield

INVENTOR
OLE OLSEN

BY Geo. H. Strong.

HIS ATTORNEY.

UNITED STATES PATENT OFFICE.

OLE OLSEN, OF FRUITVALE, CALIFORNIA, ASSIGNOR OF ONE-HALF TO LOUIS WIENER, OF ALAMEDA, CALIFORNIA.

PNEUMATIC-PRESSURE GAGE.

984,153.      Specification of Letters Patent.      Patented Feb. 14, 1911.

Application filed July 21, 1909. Serial No. 508,716.

*To all whom it may concern:*

Be it known that I, OLE OLSEN, a citizen of the United States, residing at Fruitvale, in the county of Alameda and State of California, have invented new and useful Improvements in Pneumatic-Pressure Gages, of which the following is a specification.

My invention relates to what I term a "pneumatic pressure gage."

It is designed especially for determining pressures, and is particularly applicable to determining such pressures in the tires of automobiles and like places where air is held under compression which it is desired to ascertain.

It consists of a transparent tube closed at one end, open at the other and having a plunger movable therein, and an attachment at the lower end of the tube whereby it may be readily applied to a valved opening communicating with the chamber containing the air; means for forming a joint with said opening and simultaneously opening the valve to admit pressure to move the piston. The tube is graduated so that when a balance of pressure is produced by a compression of the air in the upper end of the tube equal to that which is admitted from below, the pressure may be readily ascertained.

Figure 1:
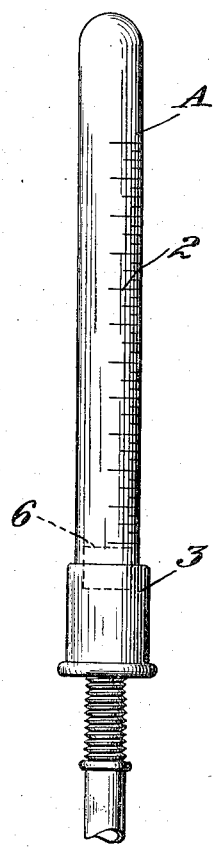
Figure 2:
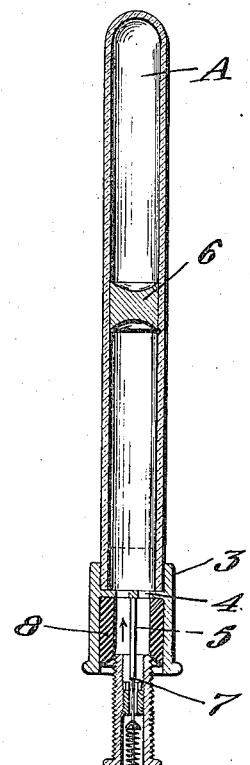
Figure 3:
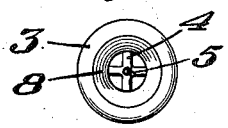
Figure 3:
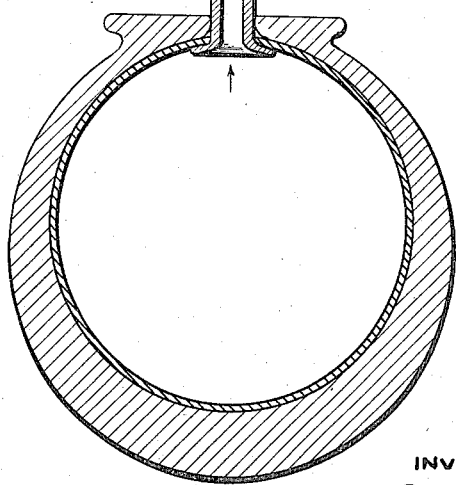

In the accompanying drawings, Figure 1 is an exterior view. Fig. 2 is a vertical section of my device, as applied. Fig. 3 is an end view.

A is a tube which may be made of glass or other transparent material, or may have a portion made transparent for the purpose of inspection. This tube is graduated with marks 2, the position of which would be ascertained by actual experiment. The upper end of the tube is closed. The lower end of the tube fits into a socket 3 which may be preferably of metal, and this socket has a diaphragm 4 integral therewith, from the center of which a pin 5 extends centrally downwardly. This diaphragm has perforations made through it to allow air to pass freely through into the tube A. Within the tube A is a plunger 6 made of any suitable material which will fit and move air-tight within the tube.

The pin 5 has its lower end chambered or concaved as shown at 7, and is adapted to engage the stem of a valve, which closes outwardly to retain air within the tire or chamber which is to be tested.

Beneath the diaphragm 4 is an annular elastic cushion 8, the lower end of which is adapted to rest upon the tube of the valve, and at the instant that the pin 7 contacts with the valve stem, a slight pressure within hermetically closes the annular cushion 8 against the end of the tube, and at the same time the pin 5 will force the valve stem inwardly, raising the valve from its seat, and allowing air from the chamber under compression to pass through the passages in the diaphragm 4, and act upon the plunger 6. This plunger will then be forced up until by compression of the air in the upper part of the tube A, the pressures on both sides of the piston are substantially equal.

The graduations upon the tube A are so made that an inspection will show instantly the amount of pressure within the compressed air chamber. As soon as this is ascertained, the device may be removed, and the pin 5, releasing the valve stem, allows the latter to close at the same time that the cushion 8 is raised from the rim of the tube, the tube being afterward closed by the usual cap.

Having thus described my invention, what I claim and desire to secure by Letters Patent is—

1. The combination in a pressure gage, of a transparent tube made straight throughout its length and provided with a scale and hermetically closed at one end and open at the other, a socket piece in which the open end of the tube is fitted, said socket piece being adapted to form a joint with the casing of an air valve of a pneumatic tire, said socket piece having a stem to engage the stem of such valve of a pneumatic tire and unseat the valve and admit air to the tube whereby the plunger is moved in said tube and registers with the graduations thereon, said tube, socket piece and said stem being axially in line and all extending directly and substantially radially from the pneumatic tire.

2. The combination in a pressure gage, of a transparent graduated tube closed at one end, a piston or plunger fitting and slidable therein, a metal socket piece in which the open end of the tube is hermetically sealed, said socket piece having an interior diaphragm with openings there-through, a stem centrally secured within the socket piece having a concaved lower end adapted to engage and retract the stem of a valve, and an elastic joint-forming gasket fitted in the lower end of the socket and adapted to form a joint with the valve casing, said tube, piston, socket piece and stem being axially in line with each other and with the valve casing.

3. The combination in a pressure gage of a transparent tube made straight throughout its length and provided with a scale and hermetically closed at one end and open at the other, a plunger or piston fitting air tight in said tube, a metallic piece in which the open end of said tube is closely fitted, said metallic piece being adapted to form a tight joint with the casing of an air valve of a pneumatic tire, and being provided with a stem to engage the stem of such valve of a pneumatic tire and unseat the valve and admit air to the tube whereby the plunger or piston is moved in said tube and registers with said scale, said tube, metallic piece and said stems being axially in line and all extending directly and substantially radially from the pneumatic tire.

In testimony whereof I have hereunto set my hand in the presence of two subscribing witnesses.

OLE OLSEN.

Witnesses:
 Geo. H. Strong,
 J. C. Brodie.